(12) United States Patent
Lawyer et al.

(10) Patent No.: US 9,100,438 B2
(45) Date of Patent: Aug. 4, 2015

(54) SHARED IDENTITY PROFILE MANAGEMENT

(75) Inventors: Justin Lawyer, Palo Alto, CA (US); Scott Barta, Milpitas, CA (US); Peiran Guo, Mountain View, CA (US)

(73) Assignee: Google Inc., Mountain View, CA (US)

( * ) Notice: Subject to any disclaimer, the term of this patent is extended or adjusted under 35 U.S.C. 154(b) by 634 days.

(21) Appl. No.: 12/410,439

(22) Filed: Mar. 24, 2009

(65) Prior Publication Data

US 2010/0131589 A1    May 27, 2010

Related U.S. Application Data

(63) Continuation of application No. 12/276,329, filed on Nov. 22, 2008, now abandoned.

(51) Int. Cl.
*G06F 15/16* (2006.01)
*H04L 29/06* (2006.01)
*G06F 17/30* (2006.01)
(Continued)

(52) U.S. Cl.
CPC ......... *H04L 63/18* (2013.01); *G06F 17/30528* (2013.01); *G06F 21/313* (2013.01); *G06Q 20/40* (2013.01); *G06Q 20/425* (2013.01); *G06Q 40/00* (2013.01); *G06F 2221/2103* (2013.01); *H04L 63/08* (2013.01)

(58) Field of Classification Search
CPC ............ H04L 2209/56; H04L 63/0428; H04L 63/062; H04L 63/0823; H04L 63/083; H04L 63/102; H04L 63/12; H04L 67/34; H04L 69/329; H04L 9/321; H04L 9/3247; H04L 63/0407; H04L 63/0414; H04L 63/0227

USPC .......................... 709/217, 218, 224
See application file for complete search history.

(56) References Cited

U.S. PATENT DOCUMENTS 5,872,917 A    2/1999    Hellman
6,766,454 B1   7/2004    Riggins
(Continued)

OTHER PUBLICATIONS

"On Demand Identity Intelligence", ID Analytics, San Diego, (Jan. 22, 2009).
(Continued)

*Primary Examiner* — Karen Tang
(74) *Attorney, Agent, or Firm* — McDermott Will & Emery LLP

(57) ABSTRACT

Example methods and apparatus are disclosed for maintaining a shared identity profile. An example method includes receiving, at a first online service provider, a plurality of profile information items from a user and storing, by the first online service provider, the profile information items in an identity profile associated with the user. In the example method, at least one of the profile information items includes user identifying information that is capable of verification. The example method also includes verifying, by the first online service provider, the user identifying information and storing, by the first online service provider, as part of the identity profile, a verification status corresponding with the verifying. The example method further includes receiving, at the first online service provider, a request, from a second online service provider, for one or more of the profile information items including the user identifying information and providing, from the first online service provider to the second online service provider, the requested profile information items and the verification status.

19 Claims, 7 Drawing Sheets

(51) Int. Cl.
*G06F 21/31* (2013.01)
*G06Q 20/40* (2012.01)
*G06Q 40/00* (2012.01)
*G06Q 20/42* (2012.01)

(56) References Cited

U.S. PATENT DOCUMENTS

| | | | |
|---|---|---|---|
| 6,782,080 B2 | 8/2004 | Leivo et al. | |
| 7,006,986 B1* | 2/2006 | Sines et al. | 705/26.35 |
| 7,383,570 B2 | 6/2008 | Pinkas et al. | |
| 7,458,508 B1 | 12/2008 | Shao et al. | |
| 8,296,245 B2* | 10/2012 | Barber et al. | 705/325 |
| 2002/0147683 A1* | 10/2002 | Capobianco et al. | 705/41 |
| 2002/0198848 A1* | 12/2002 | Michener | 705/75 |
| 2003/0140001 A1* | 7/2003 | Macklin et al. | 705/39 |
| 2003/0177361 A1* | 9/2003 | Wheeler et al. | 713/176 |
| 2005/0273442 A1* | 12/2005 | Bennett et al. | 705/67 |
| 2006/0106738 A1* | 5/2006 | Schleicher | 705/401 |
| 2006/0294025 A1* | 12/2006 | Mengerink | 705/77 |
| 2007/0226784 A1 | 9/2007 | Ueda et al. | |
| 2007/0250920 A1 | 10/2007 | Lindsay | |
| 2007/0266257 A1 | 11/2007 | Camaisa et al. | |
| 2007/0288107 A1* | 12/2007 | Fernandez-Ivern et al. | 700/91 |
| 2008/0028069 A1* | 1/2008 | Urbanek et al. | 709/224 |
| 2008/0033877 A1* | 2/2008 | Blair et al. | 705/44 |
| 2008/0109657 A1 | 5/2008 | Bajaj et al. | |
| 2008/0319875 A1* | 12/2008 | Levchin et al. | 705/26 |
| 2008/0319899 A1* | 12/2008 | Levchin et al. | 705/39 |
| 2009/0047928 A1 | 2/2009 | Utsch et al. | |
| 2009/0089182 A1* | 4/2009 | Light et al. | 705/26 |
| 2009/0132273 A1* | 5/2009 | Boesch | 705/1 |
| 2009/0178125 A1* | 7/2009 | Barber et al. | 726/6 |
| 2009/0259588 A1 | 10/2009 | Lindsay | |
| 2009/0292927 A1 | 11/2009 | Wenzel et al. | |
| 2009/0319426 A1 | 12/2009 | Bain et al. | |
| 2010/0131409 A1 | 5/2010 | Lawyer et al. | |
| 2010/0257102 A1* | 10/2010 | Perlman | 705/75 |
| 2011/0197266 A1 | 8/2011 | Chu et al. | |
| 2012/0052881 A1 | 3/2012 | Heffez | |
| 2012/0159177 A1 | 6/2012 | Bajaj et al. | |
| 2014/0250003 A1* | 9/2014 | Levchin et al. | 705/41 |
| 2015/0077228 A1* | 3/2015 | Dua | 340/5.81 |

OTHER PUBLICATIONS

Non-Final Office Action for U.S. Appl. No. 21/276,329, mailed Jan. 18, 2011, 17 pages.

Non-Final Office Action for U.S. Appl. No. 13/184,935, mailed Sep. 19, 2012, 22 pages.

* cited by examiner

| INFORMATION ITEM | VALUE | VERIFIED | VERIFICATION METHOD | VERIFIED BY | DATE VERIFIED |
|---|---|---|---|---|---|
| Name | Joe Smith | Y | Verizon directory | Google | 5-Feb-08 |
| Phone number | 408-555-1234 | Y | Verizon directory | Google | 5-Feb-08 |
| Mailing address | 5432 Main St San Jose, CA 95101 | Y | Verizon directory | Google | 5-Feb-08 |
| Email address | joesmith@google.com | Y | Google employee database | Google | 1-Jun-08 |
| Current employer | Google | Y | Google employee database | Google | 1-Jun-08 |
| Prior employer | Apple | N | NA | NA | NA |
| Credit card number | 4567-8910-2345-6789 | Y | Mastercard database | Equifax | 5-Jul-08 |
| Bank account | 7654321 | Y | Bank of America database | Bank of America | 25-Jun-08 |
| Academic institution | Stanford University | N | NA | NA | NA |
| Professional organization | IEEE | N | NA | NA | NA |

200

CONTACT LIST
210

FIG. 2

SHARED IDENTITY PROFILE MANAGEMENT

CROSS REFERENCE TO RELATED APPLICATIONS

This application claims the benefit under 35 U.S.C. §120 as a continuation application of U.S. patent application Ser. No. 12/276,329, filed on Nov. 22, 2008 entitled Identification Verification with User Challenge. The disclosure of U.S. patent application Ser. No. 12/276,329 is incorporated by reference herein in its entirety.

TECHNICAL FIELD

This description relates generally to management of a shared user identity profile.

BACKGROUND

As part of the rapid growth of Internet and World Wide Web use, there has been an ever increasing growth in the availability of online services. Such online services include, for example, online banking online email services, online dating services and online social networks. A number of providers may provide a number of such services. These services are, however, subject to fraud and abuse. For example, some users may sign up for online services using false identification information with the intent to misuse or abuse such services. For instance, someone may sign up for numerous email accounts that are used to generate unsolicited commercial emails, known as SPAM. In other cases, someone may use false information to sign up for an online service with the intent of distributing materials for which the particular online service is not intended. For example, someone may sign up with an online social networking service with the intent to use the social networking service to distribute commercial material. In some cases, such attempts to misuse or abuse online services is automated, where a computer program is used to sign up for such online services and carry out an improper use. Yet another type of misuse that may occur is payment fraud, such as a user attempting to make an online purchase using stolen credit card information.

In order to reduce the amount of fraud and/or abuse, online service providers may use a number of techniques. For instance, an online service may require an individual attempting to sign up for an online service to provide some proof of their identity or perform an action that provides some level of confidence that the individual's intent is not to misuse the online service or services. For instance, in the case of automated attempts to access an online service, many online service providers use what is know as CAPTCHA technology, where a distorted series of characters is presented on a graphical interface and access to the service (or services) is allowed only if the correct sequence of characters is entered by a user and returned to the online service provider's server that is monitoring access to the online services. A number of other techniques also exist. A drawback of current approaches is that they do not provide sufficient assurance that a user seeking to access an online service is who they claim to be. Another drawback of current approaches it that abusers of online services constantly come up with ways of circumventing fraud protection techniques, such as automated ways of defeating CAPTCHA technology.

Users of online services may also obtain different services from different online service providers. When requesting services from such online service providers, a user will set up a profile with each individual online service provider. Each individual online service provider may or may not verify the information included in a user's profile created exclusively to access services from a specific online service provider. Regardless, of how the individual online service providers maintain, process and make use of user profile data, a user having to recreate (and verify, if applicable) a user profile for each online service user wishes to access online services from may be frustrating and time consuming for the user.

SUMMARY

In a first general aspect, an example computer-implemented method, which may be implemented by an online service provider system, includes requesting, from a user, a name and user identifying information associated with the provided name. The example method also includes querying a trusted database based on the provided name and the user identifying information and determining if a match exists in the database between the provided name and the user identifying information. In the event a match exists, the example method includes presenting a challenge to the user, the challenge being based on the user identifying information and determining a verification status of the user's identity based on a result of the challenge. The example method further includes designating the user's identity as verified or unverified in accordance with the verification status. In a second aspect, the above method may be embodied as software instructions on a computer readable medium.

BRIEF DESCRIPTION OF THE DRAWINGS

FIG. 2 is a diagram illustrating an example embodiment of a user profile.

Like reference symbols in the various drawings indicate like elements.

DETAILED DESCRIPTION

Figure 1:
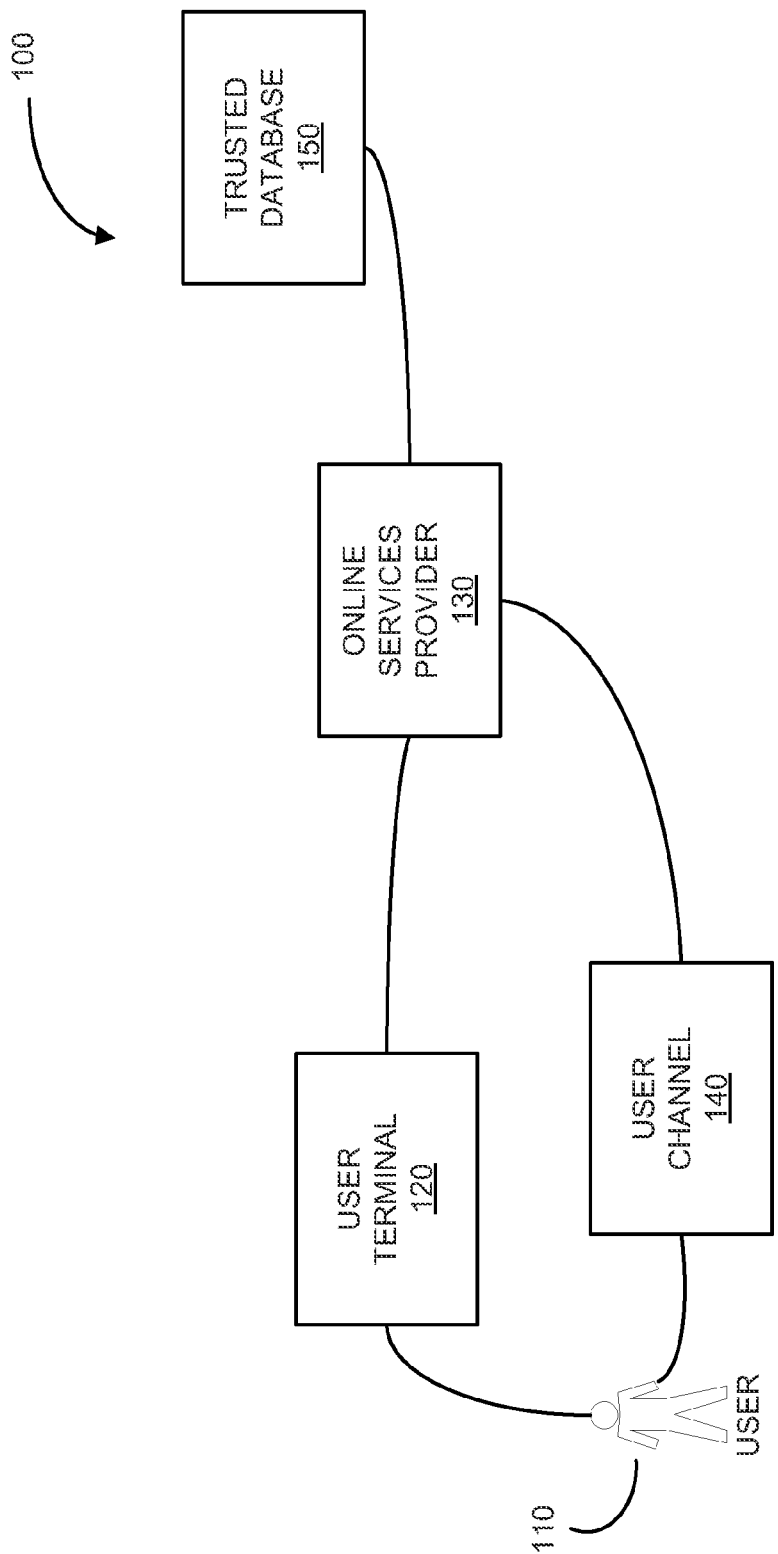
FIG. 1 is a block diagram illustrating an example embodiment of a network.

FIG. 1 is a block diagram illustrating an example embodiment of a system 100 in which identification verification using data verification and a user challenge may be implemented. As illustrated in FIG. 1, a user 110 may use a user terminal 120 to gain access to an online service provider 130 (e.g., a server configured to provide online services). The user terminal 120 may take a number of forms. For instance, the user terminal 120 may be a personal computer, an internet appliance or a web-enabled mobile device, such as a personal digital assistant (PDA). The user terminal 120 may communicate with the online service provider 130 via a data network, such as the Internet or a wireless data network, for example.

In order to grant the user 110 access to an online service offered by the online service provider 130, the online service provider 130 may provide one or more interfaces (e.g., graphical user interfaces) to the user terminal 120 over the data network. Such graphical user interfaces (GUIs) may request that the user 110 enter information about himself or herself via the GUIs and then transmit that identifying information to the online service provider 130. For instance, an online service provider 130 may provide a GUI requesting the user to provide a name and user identifying information, such as described herein.

Once the user 110 has entered information in response to the request, the entered information then may be communicated to the online service provider 130 via the data network, such as in response to the user clicking a button in an appropriate GUI to transmit the entered information. In an example embodiment, the user identifying information may include information associated with the user that can be verified, such as a mailing address, a residence address, a home telephone number, a mobile telephone number, a business telephone number, a facsimile telephone number, a bank account number, a credit card account number, an email address, or any other item of information associated with a person, where the information is subject to verification. The user identifying information may be verified in accordance with the techniques described herein and then used to challenge the user to determine whether or not to designate an online identity of the person as trusted or verified.

In an example embodiment, the online service provider 130 may use the information provided by the user 110 to query a trusted database in order to verify that the information provided by the user agrees with data contained in the trusted database 150. For instance, if the user 110 provides a name, address and phone number, the online service provider may query a telephone directory database that is maintained by a telecommunication service provider.

In response to the query from the online service provider 130, the trusted database 150 may determine that the name, address and phone number provided by the user match information contained in the trusted database 150. For example, the trusted database 150 may determine that the name, address and phone number provided in the query (as received from the user 110) correspond with an actual person listed in the telephone directory database. In this case, the trusted database 150, in response to the query, may inform the online service provider 130 that a match was found in the trusted database 150. In this situation, the online service provider 130 would have a high level of confidence that the provided name, address and phone number were not falsified and correspond with the person whose name was provided to the online service provider 130 by the user 110.

Alternatively, the trusted database 150 may determine that there is a mismatch in the data included in the query from the online service provider 130. For instance, the phone number may exist in the telephone directory database but may be assigned to a customer with a different name and/or address. In other instances, a mismatch may occur where an address is included in the database but the name and/or telephone number associated with that address are inaccurate or do not match the information provided by the user 110. In such instances, the trusted database 150 may indicate the data mismatch to the online service provider 130 in response to the query.

In other instances, the data provided by the user 110 may not match any information in the trusted database 150. For instance, the trusted database may not have any records corresponding with the provided name, address or phone number. In such a situation, the trusted database 150 may indicate that no data exists in response to the query.

Depending on the response received to the query from the trusted database 150, the online service provider 130 may take a number of appropriate actions. For example, in cases where the trusted database 150 indicates a data mismatch, the online service provider 130 may notify the user 110 (e.g., via a GUI communicated to, and displayed on the user terminal 120) that the provided data could not be verified. In such instances, in example embodiments, the user 110 may be asked to correct the provided data or may be informed that access to the online service is denied. Of course, other approaches are possible.

In another embodiment, if the trusted database 150 indicates to the online service provider 130, in response to the query, that no data exists, the online service provider 130 may, again, take a number of appropriate actions. For instance, the online service provider 130 may send another query to another trusted database to attempt to verify the data provided by the user 110. Alternatively, the online service provider 130 may inform the user 110 (e.g., via a GUI) that the provided data could not be verified. The online service provider 130 may then request that the user correct the information, provide additional information for verification purposes or inform the user 110 that access to the online service or services is denied, as some examples.

In yet another embodiment, if the trusted database 150, in response to the query from the online service provider 130, indicates that a match exists for the data provided by the user 110, the online service provider 130 may then challenge the user 110 based on the verified information. Such a user challenge may be done in a number of ways, and the techniques described herein for conducting a user challenge are given by way of example. In one example embodiment, the online service provider 130 may provide a verification code to the user through a user channel 140, such as by calling a verified home telephone number, and require that the user return a correct version of the verification code using another channel, such as the user terminal 120, to prove that the online user 110 has access to a channel associated with the verified user identifying information. In such an approach, at least one of the channels used in the challenge would be associated with verified user identifying information.

In such an approach, if the user successfully completes the challenge, then, because the name provided by the user 110 has been verified to be associated with the user identifying information and the user 110 has proven access to a communication channel associated with the verified information, the individual may be considered to be verified/trusted and highly likely to be that individual. In other embodiments, the online service provider 130 may provide a verification code to the user 110 through an channel not associated with verified user identifying information (an unverified channel) and then require that that the user accurately supply the provided code to the online service provider 130 via a channel associated with verified user identifying information (a verified channel) to demonstrate that the user 110 has access to the verified channel.

For instance, the user 110 may be supplied a verification code in a short messaging system (SMS) message that is sent to an unverified mobile phone number. The user 110 may then provide the verification code to the online service provider 130 using a verified home phone number, where caller identification information is used to confirm use of the verified phone number.

Such a verification code may be provided to, and returned from the user 110 in a number of ways. As noted above, in order to demonstrate that the user 110 has access to a verified channel, in an example embodiment, the verification code is either provided to the user via a verified channel or returned via the verified channel. For instance, the verification code may be included in a GUI provided to the (unverified) user terminal 120 by the online service provider 130 and returned to the online service provider 130 by the user 110 via a verified telephone number (land or mobile), or via another verified channel.

Alternatively, if a telephone number provided by the user 110 corresponds with a mobile telephone, the verification code may be provided to the user 110 via a short messaging system (SMS) message sent to the mobile telephone after the mobile telephone number is verified. The user 110 may then return the verification via a GUI displayed on the (unverified) user terminal 120, for example. In such approaches, the user 110 demonstrates that he or she is able to receive a verification code via one channel (e.g., either a verified channel or an unverified channel), has access to the verified channel, and can return the verification code through the alternative channel (e.g., either unverified channel or the verified channel, respectively).

In other embodiments, verified channels (e.g., different resources) may be used to provide and receive a verification code. For instance, in an example embodiment, a verification code may be provided to a user 100 by an online service provider 130 via a verified telephone number and the user 100 may return the verification code to the online service provider 130 via a verified email address, where the email address may be verified using techniques similar to those described above (e.g., using a trusted database of email addresses and corresponding names of email account holders).

In still other embodiments, the verification code may be provided to the user in an email sent to a verified email address. In yet other embodiments, a phone call may be placed to the user 110 at a verified phone number and the verification code may be provided to the user 110 via the called telephone. In still other embodiments, the verification code may be provided to the user 110 by sending a physical mailer (e.g., a postcard or letter) to a verified mailing address. Still other embodiments may include sending a verification code via an amount deposited in a verified bank account or by making a small charge or refund to a credit card account and including the verification code in a transaction description for the charge or refund. Of course, other techniques for providing a verification code to a user are possible.

In the above example approaches, once the user 110 has received the verification code, in like fashion as discussed above, the user 110 may then respond to the online service provider 130 to demonstrate that the user 110 has access to the verified channel either by demonstrating that the user 110 received the verification code via the verified channel or by providing the correct verification code to the online service provider 130 using the verified channel.

A number of techniques may be used for the user 110 to return the provided verification code to the online service provider 130, and the user 110 need not return the verification code through the same channel through which the user received the code as long as one of the resources used to provide or return the verification code to the online service provider is a verified channel. For instance, the user 110 may provide a verification code to the online service provider 130 by entering the verification code using a telephone that is associated with a verified phone number.

In another example embodiment, the user 110 may provide a verification code to the online service provider 130 by entering the verification code using a GUI provided by the online service provider 130 to the user terminal 120. In still another example embodiment, the user 110 may provide a verification code to the online service provider 130 by sending the verification code to the online service provider in an email sent from a verified email address. Depending on the particular embodiment, other techniques may be used for the user 110 to communicate a verification code to the online service provider 130. In such approaches, different channels are used to receive and return the verification code, with at least one of the channels being a verified channel.

In an example embodiment, when the online service provider 130 receives a verification code from the user 110 (user verification code), the online service provider 130 may then compare the user verification code with the original verification code (provided to the user 110 by the online service provider 130). If the user verification code matches the original verification code, the online service provider 130 may then determine that the user 110 has access to the verified user channel through which the online service provider 130 sent the verification code to the user 110, or through which the user 110 returned the verification code to the online service provider 130.

As a result of such a match, the online service provider 130 may then determine that the user 110 either is the person associated with the verified data or is a person who has access to the personal information about the person associated with the data. As a result of such a determination, the online service provider 130 may grant the user 110 access to the online service or services provided by the online service provider 130. For instance, the online service provider 130 may grant the user 110 access to protected functionality, may grant the user unrestricted access to one or more online services, and/or may grant the user 100 a "trusted" status/badge.

However, if the user verification code does not match the original verification code, the online service provider 130 may then determine that the user 110 does not, in fact, have access to the verified user channel. In such a situation, the online service provider 130 may deny the user 110 access to any online services provided by the online service provider 130. For instance, the online service provider 130 may deny the user 110 access to protected functionality, may deny the user unrestricted access to one or more online services, and/or may refuse to grant the user 100 a "trusted" status/badge.

In an example embodiment, the online service provider 130 may provide one or more online services, which may include an online social network or online professional network, as some examples. Other examples may include advertising services, payment services, blogs, online publishing services, online photo albums, online dating service, among a number of other online services. In the case of an online social or professional networking service, a user may enter various pieces of personal information to create a user profile for use with the social or professional networking service.

FIG. 2 is a diagram illustrating an example embodiment of such a user profile 200. FIG. 2 will be described with further reference to the system 100 of FIG. 1, in which such a user profile 200 may be implemented.

Depending on the particular embodiment, the user profile 200 may be made available to multiple online service providers for the purpose of providing online services or other services to an associated user. For instance, the user profile 200 may be used for multiple services within a company, or may be made available to (shared with) other companies with complementary services. For instance, the user profile 200 may be used for online shopping purposes if the user has included bank account or credit card information in the profile 200 in addition to using the user profile 200 for an online professional networking service. In other example embodiments, if a user 110 wishes to use online services from different online service providers, in an example embodiment, the user profile 200 may be accessed by the multiple online service providers as part of the process of them providing their respective online services. Such an approach allows the user to create a single user profile 200 that is used by multiple online service providers rather than the user having to take the time to create individual profiles with each respective online service provider. In the case of a shared user profile 200, login/password procedures may be implemented that are trusted by each online service provider that accesses the user profile 200. Such an approach may insure that that information and updates to the user profile 200 are respected by the companies accessing the user profile 200.

As shown in FIG. 2, the user profile 200 may include various pieces of information about the user 110. For instance, the profile 200 may include a name, phone number, mailing address, email address, current employer, one or more previous employers, a credit card number, a bank account number, [billing address, shipping address, backup email address, academic institutions the user 110 has attended and professional organizations to which the user 110 belongs. The user profile 200 may also include a number of other profile information items. In an example embodiment, if the user profile 200 is a business profile, the profile 200 may include retail locations, employees, website addresses, etc. The particular items included in the user profile 200 may depend on the particular online services provided by the online service providers that make use of the user profile 200.

As is also shown in FIG. 2, the user profile 200 may include a contact list 210 of the user 110. Contact list 210 may include contact information for friends and/or business associates of the user 110. If multiple online service providers make use of the user profile 200, some or all of the information included in the user profile 200 may be shared with the various online service providers. In an example embodiment, the user 110 may determine the particular pieces of information of the user profile 200 to which each online service provider has access. As an example, a user could choose to share contacts or subsets of contacts with an online service provider, decide which information each service can display to the outside world, etc.

When creating the user profile 200, the user 110 may enter values for each item of the user profile 200 using, for example, a GUI provided by the online service provider 130 to the user terminal 120. As illustrated in FIG. 2, the user profile 200 is for a user Joe Smith with a phone number of 408-555-1234 and mailing address 5432 Main St., San Jose Calif. 95101. In the user profile 200, an email address for Joe Smith of joesmith google.com is included along with an indication of a current employer of Google. Also included in the user profile 200 is an indication of a previous employer of Apple, a credit card number, a bank account number, an indication that the user 110 attended Stanford University and an indication that the user 110 is a member of the IEEE professional organization.

After receiving the profile information included in the user profile 200, the online service provider 130 may verify some or all of the information included in the profile 200. For instance, when the profile 200 is created, the online service provider 130 may verify the phone number and/or address included in the profile 200 by matching them to the name included in the profile 200. This verification may be done using the techniques described herein, or using any other appropriate approach. For example, verification of the phone number and mailing address may be done using data verification and a user challenge, as was described above. In another example embodiment, verification of profile information items included in the profile 200 may be done using only data verification, e.g., by querying a trusted database.

As shown in FIG. 2, the profile 200 may also include, for each profile information item, an indication of whether or not each profile information item has been verified, the method (e.g., a specific trusted database) used to verify the profile information item (if verification has been done), a company or entity that performed the verification and the date the verification (if any) for each item was performed. In an example embodiment, another online service provider may request that one or more of the profile information items be verified (if not previously verified) or that a re-verification be done if the verification date is not consistent with the requirements of the particular online service provider. If an online service provider requests verification or re-verification of a profile information item, the profile 200 may be updated to reflect the most recent verification status for that item. In such an approach, other online service providers accessing the user profile 200 may also benefit from the updated verification status for the items of the user profile 200. In an example embodiment, verification history for each of the items in the profile 200 may be kept.

Figure 3A:
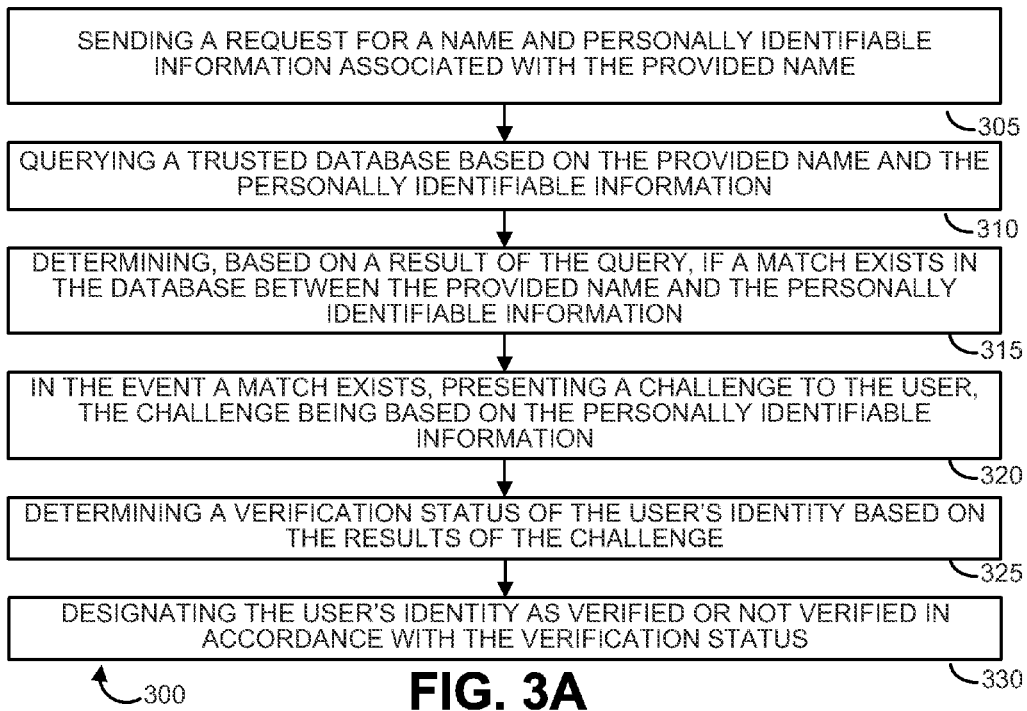
FIGS. 3A-C are flowcharts illustrating example embodiments of methods.
Figure 3B:
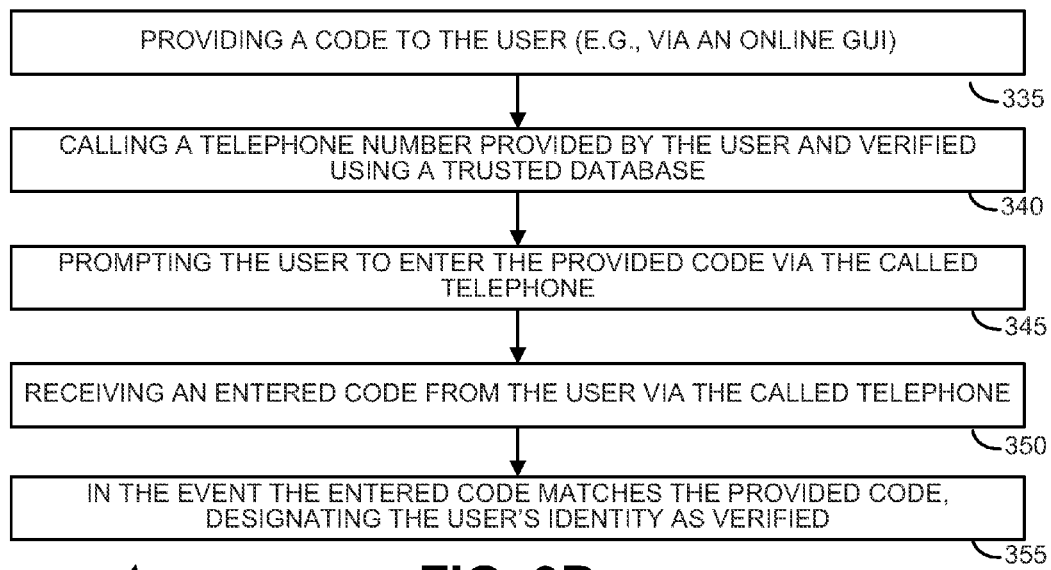
Figure 3C:
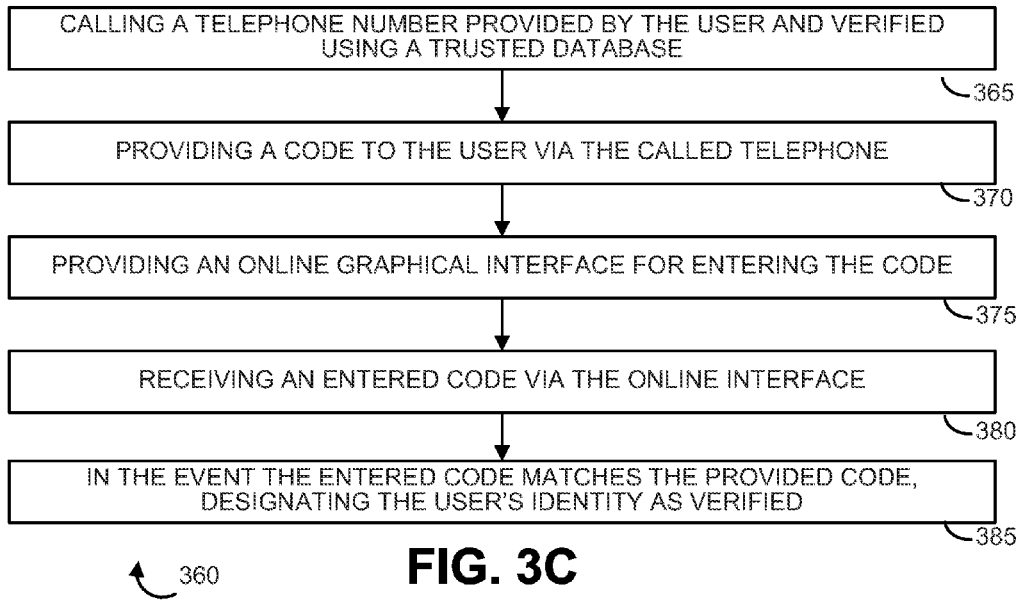

FIG. 3A illustrates an example embodiment of a method for verifying an online user using data verification and a user challenge, such as previously discussed with respect to FIG. 1. FIGS. 3B and 3C illustrate example embodiments for performing a user challenge. FIGS. 3A-C will also be described with further reference to FIG. 1.

FIG. 3A illustrates an example method 300 for verifying a user (e.g., the user 110) using data verification and a user challenge, where the user challenge is performed such that the user 110 demonstrates access to a verified channel (e.g., that is associated with verified data listed in the user profile 200). The method 300 may include, at block 305, the online service provider 130 requesting (e.g., via a GUI) a name of the user 110 in response to the user requesting access to an online service. The GUI requesting the user 110's name may also request user identifying information associated with the user's name. As discussed above, the user identifying information may be, for example, a telephone number and/or a mailing address, or some other information associated with the user. At block 310, the method 300 may include querying a trusted database (the trusted database 150) based on the user's name and the user identifying information. For instance, the online service provider 130 may send a query to a trusted telephone directory database. Such a query may include, for example, the name, address and telephone number provided by the user 110.

At block 315, the method 300 may include determining if a match exists in the trusted database 150 between the user's name and the user identifying information. In this example, the determination may include the online service provider receiving a response to the query from the trusted database 150. As previously described, the response from the trusted database 150 may indicate that a match to the data included in the query was found, a mismatch was found or no data was found. In the event that a match exists, at block 320, the method 300 may include challenging the user to demonstrate access to a channel associated with the verified information (verified channel, as discussed above), for example, using a verification code in any of the fashions that were previously discussed.

At block 325, the method 300 may include determining a verification status of the user's identity based on a result of the challenge. For instance, if the user provides a correct verification code, the verification status may be determined as verified/trusted. Alternatively, if the correct code is not provided, the verification status may be determined as unverified/untrusted.

At block 330, the method 300 may include designating the user's identity as verified or unverified in accordance with the verification status. For example, the determined verification status may be assigned to the user profile 200, indicating that a person associated with that profile is trusted (e.g., allowed to access online services) or is not trusted (e.g., not allowed to access online services).

FIG. 3B is a flowchart illustrating an example method 330 for performing a user challenge. At block 335, the method 330 may include providing a code (verification code) to the user 110. As discussed above and in further detail below, a number of approaches for providing a verification code to the user may be used. At block 340, the method 330 may include calling a verified phone number provided by the user (e.g., a phone number verified using the trusted database 150). At block 345, the method 330 may include prompting the user 110 to enter the provided code via the called telephone, such as by using an automated voice prompt, for example. At block 350, the method 300 may further include receiving an entered (user) verification code from the user 110 via the called telephone (e.g., using the telephone's keypad). In the event the user verification code matches the code provided by the online service provider 130, the method 330, at block 355, may include designating the user 110's identity as verified and allowing the user 110 access to online services provided by the online service provider 130.

FIG. 3C is a flowchart illustrating another example method 360 for conducting a user challenge based on data verified using a trusted database (database 150). At block 365, the method 360 may include calling the verified telephone number and, at block 370, providing a verification code to the user via the called telephone, or using any of the techniques described here. At block 375, the method 360 may further include providing an online GUI for entering the code. Such a GUI may be provided in any appropriate fashion, such as using the techniques described above. At block 380, the method 360 may also include receiving an entered code via the online GUI, such as by the user 110 entering the code using the user terminal 120 in the GUI and transmitting the entered code to the online service provider 130 via a data network, for example. In the event the entered code matches the provided code, the method 360 may still further include, at block 385, designating the user's identity as verified and allowing the user access to online services provided by the online service provider 130.

As discussed above, other techniques for providing a verification code to a user may be employed. For instance, a verification code may be provided in an SMS message sent to a verified mobile telephone number. Alternatively, a verification code may be provided using a verified email address or a verified physical mailing address. In other example embodiments, the user verification code may be communicated to the online service provider using any appropriate technique. For instance, the user verification code may be communicated to the online service provider 130 in an SMS message sent from a verified mobile telephone number or in an email from a verified email address.

Figure 4:
FIG. 4 is a diagram illustrating an example embodiment of a user interface.

FIG. 4 is a diagram illustrating an example embodiment of an interface 400 for providing a verification code 410 to the user 110. The interface 400 may be included, for example, in a web-based GUI. Alternatively, the interface 400 may be included in an SMS message or an email message. The interface 400 may also include a button 420 (such as in a web-based GUI) that the user 110 may click to initiate a phone call from the online service provider 130 for entering the verification code.

Figure 5:
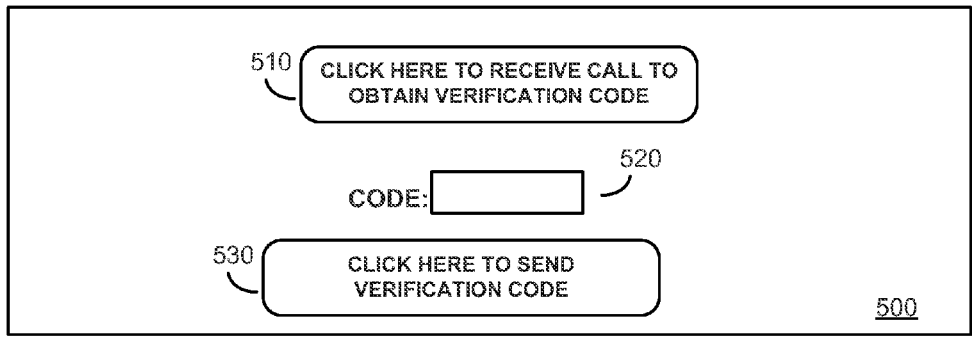
FIG. 5 is a diagram illustrating another example embodiment of a user interface.

FIG. 5 is a diagram illustrating an interface 500 for the user 110 to request a call to receive a verification code and then enter the verification code for transmission to the online service provider 130. As with the interface 400 illustrated in FIG. 4, the interface 500 may be a web-based interface or may be implemented in another fashion. As shown in FIG. 5, the interface 500 may include a button 510 that, when clicked by the user 110, will initiate a phone call to a verified telephone number. The call may be made by the online service provider 130 and the verification code may be provided to the user 110 during the call. For instance, text-to-speech software may be used to provide the verification code to the user 110.

The interface 500 may also include a field 510 that may be used by the user 110 to enter the provided verification code, e.g., using the user terminal 120. The interface 500 may further include a button 520 (such as in a web-based GUI) that the user 110 may click to transmit an entered code to the online service provider 130 to complete a user challenge, such as in the manners previously discussed.

Figure 6:
FIG. 6 is a diagram illustrating an example embodiment of a financial transaction that may be used in conjunction with the example methods illustrated in FIGS. 3, 7 and 8.

Other techniques may also be used to carry out a user challenge. For example, a challenge transaction can be made to a user's credit card account or bank account. FIG. 6 is a diagram illustrating an example embodiment of such a challenge transaction 600. As shown in FIG. 6, the challenge transaction may include a transaction date 610, a transaction description 620 and a transaction amount 630. The transaction description 620 may include a verification code that a user may then provide to an online service provider to complete a user challenge. Alternatively, the online service provider may request that the user provide the transaction amount 620 to complete the user challenge.

As was discussed above, in an example embodiment, user information contained in a user profile, such as the user profile 200 illustrated in FIG. 2, may be shared by multiple online service providers. Such an approach may allow a user to create a single persistent profile 200, that may be verified and maintained by a first online service provider and accessed by a number of other online service providers. Sharing the profile 200 may prevent the user 110 from having to create and verify his or her profile information for each online service provider the user 110 wishes to use. As is discussed further below, in an example embodiment, an online service provider that maintains such persistent user profiles may provide fee-based profile verification services to other online service providers.

In another example embodiment, a first online service provider may receive profile information items from a user it wishes to verify, but the first online service provider may not implement the functionality to conduct the user identity verification. In such a situation, the first online service provider may provide the profile information items to a second online service provider (e.g., in a verification request) and the second online service provider may conduct a verification of one or more of the user profile items and provide the verification results to the first online service provider. Once the verification is completed, the same user may then share his or her profile across service providers. In such an approach, the service providers that access the profile may share profile updates. For instance, the verifying service provider's profile for the user may be used as a master, shared profile.

Figure 7:
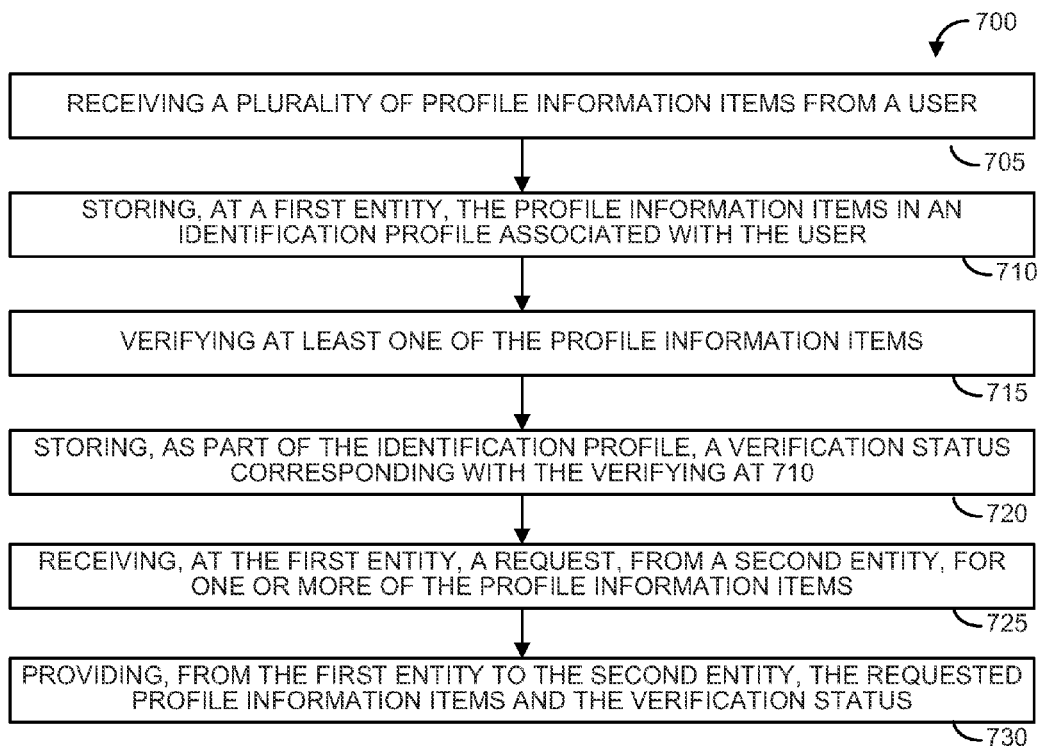
FIG. 7 is a flowchart illustrating an example embodiment of a method.

FIG. 7 is a flowchart illustrating an example method 700 for creation and maintenance of such a persistent, shared user profile 200. The method 700 may include, at block 705, receiving a plurality of profile information items from a user, such as the profile information items illustrated in the profile 200 in FIG. 2. At block 710, the method 700 may include storing, at a first entity (e.g., a first online service provider), the profile information items in an identification profile (e.g., the user profile 200) associated with the user (e.g., the user 110). At block 715, the method 700 may include verifying at least one of the profile information items. Such verification may be done using the techniques described herein, or using any other appropriate technique.

At block 720, the method 700 may further include storing, as part of the identification profile 200, a verification status corresponding with the verification performed at block 715. As was discussed above, the verification status may include, for each profile information item, an indication of whether the profile information item has been verified or not. If the profile information item has been verified, the verification status may further include an indication of how the item was verified (e.g., the trusted database used) and the date on which the verification was done.

The method 700 may further include, at block 725, receiving, at the first entity (e.g., the first online service provider), a request, from a second entity (a second online service provider), for one or more of the profile information items. For example, the second online service provider may request a user's name, address and phone number. At block 730, the method 700 may further include providing, from the first entity to the second entity, the requested profile information items and the verification status.

Figure 8:
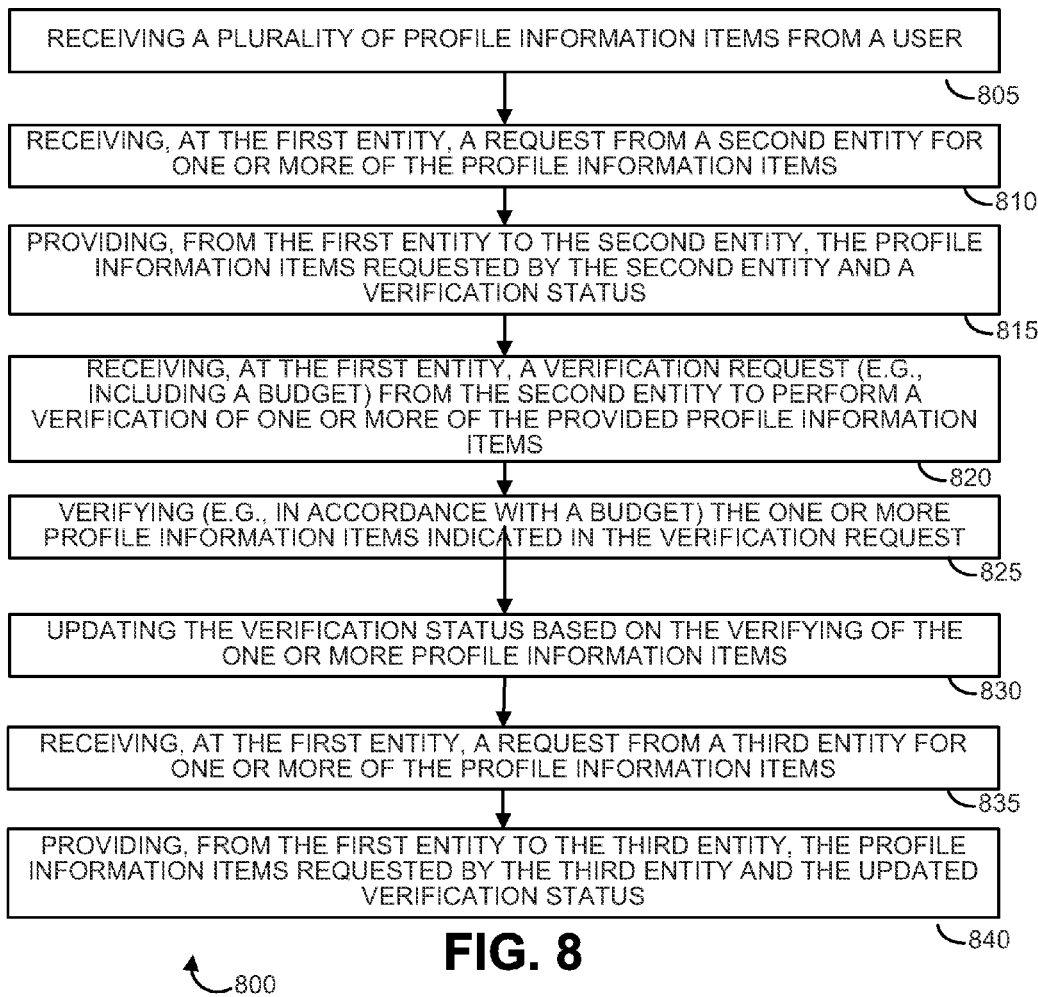
FIG. 8 is a flowchart illustrating another example embodiment of a method.

FIG. 8 is a flowchart illustrating another example method 800 for creation and maintenance of such a persistent, shared user profile 200. At block 805, in like fashion as block 705 of the method 700, the method 800 may include receiving a plurality of profile information items from a user, such as the profile information items illustrated in the profile 200 in FIG. 2. At block 810, in like fashion as block 710 of the method 700, the method 800 may include storing, at a first entity (e.g., a first online service provider), the profile information items in an identification profile (e.g., the user profile 200) associated with the user (e.g. the user 110).

At block 815, the method 800 may include receiving, at the first entity (the first online service provider), a request from a second entity (a second online service provider) for one or more of the profile information items. The method 800 may further include, at block 815, providing, from the first entity to the second entity, the profile information items requested by the second entity and a verification status, where the verification status indicates, for each provided profile item, that the profile information items have not yet been verified. At block 820, the method 800 may further include, receiving, at the first entity, a verification request from the second entity to perform a verification of one or more of the provided profile information items. In the method 800, the request, at block 820, to perform the verification, may be made in response to the verification status indicating that the requested profile information items have not been previously verified.

In an example embodiment, the verification request at block 820 may also include a budget for performing the verification. For instance, a trusted database lookup may represent a cost of ten cents and a user challenge phone call may represent a of cost twenty-five cents. Therefore, in order to complete such a verification including the user challenge phone call, the corresponding verification request should indicate a budget of thirty-five cents for performing the verification, as one example. A business operating the second entity would then pay the business operation the first entity thirty-five cents in payment for carrying out the verification request. For instance, if one data verification request does not find a match (i.e., there is no data available), additional trusted databases may be consulted, at additional cost, until either the budget is used up, a match is found, or a mismatch is found (i.e., it is confirmed that the user is not the person they claim to be.

At block 825, the method 800 may further include verifying the one or more profile information items indicated in the verification request. In an example embodiment, the verification performed at block 825 may be carried out in accordance with a budget, as discussed above, that is indicated in the verification request from the second entity. At block 830, the method 800 may further include updating the verification status of the user profile based on the verification done at block 825. The method 800, at block 835 may still further include receiving, at the first entity, a request from a third entity (e.g., a third online service provider) for one or more of the profile information items. The method 800, at block 840, may also include providing, from the first entity to the third entity, the profile information items requested by the third entity and the updated verification status.

In other example embodiment, an online service provider may also make a verification request for profile information items where, based on the verification status, the verification date in the user profile indicates that the verification date for the profile information items exceeds a verification freshness threshold. For instance, an online service provider may require that a user's mailing address and/or phone number be verified once per month. In such an approach, if the last verification date for a user's mailing address and/or phone number indicated in the verification status is more than one month ago, the online service provider may, at block 820 of the method 800, request that the mailing address and/or phone number be re-verified.

Figure 9:
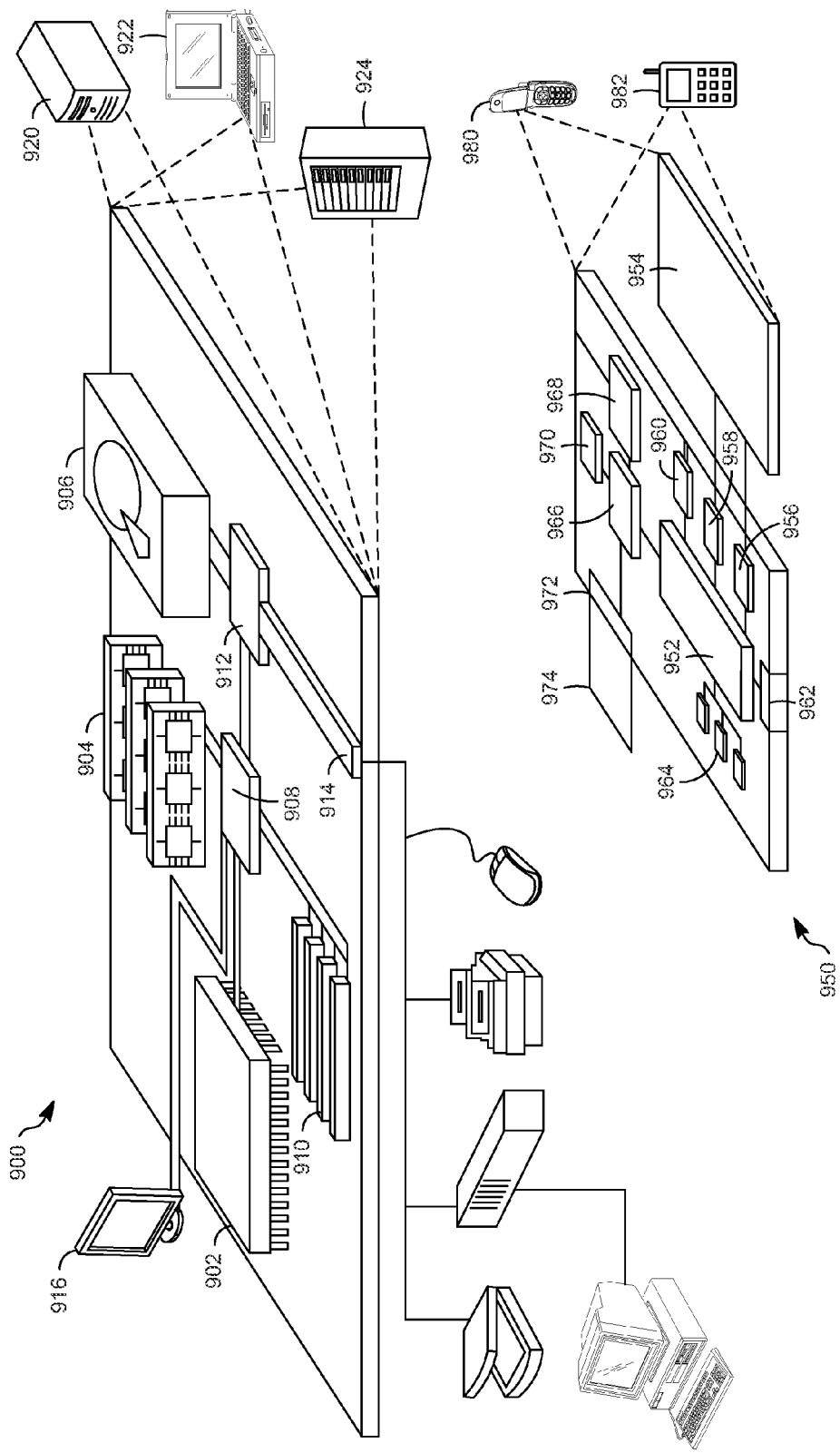
FIG. 9 shows an example of a computer device and a mobile computer device that can be used to implement the techniques described here.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
receiving, at a first online service provider server, a plurality of profile information items from a user, wherein one or more of the plurality of profile information items comprises respective user identifying information that is capable of verification;
storing, by the first online service provider server, the plurality of profile information items in an identity profile associated with the user, each of the profile information items including an indication as to whether the profile information item has been verified, a first subset of the profile information items being unverified and a second subset of the profile information items being verified;
receiving, at the first online service provide server from a second online service provider server, a first request for the plurality of profile information items;
providing the plurality of profile information items to the second online service provider in response to the first request;
receiving, from a second online service provider server and after providing the plurality of profile information items to the second online service provider, a second request to verify the first subset of profile information items;
verifying, by the first online service provider server, in response to receiving the second request, the first subset of profile information items;
receiving a third request for the verified first subset; and
providing the verified first subset in response to the third request.

2. The computer-implemented method of claim 1, wherein the second request includes a budget for verifying one or more of the first subset of profile information items.

3. The computer-implemented method of claim 2, further comprising:
verifying the one or more of the first subset of profile information items in accordance with the budget.

4. The computer-implemented method of claim 1, wherein, in the event a respective profile information item has been verified, the verification status comprises a corresponding date when the verification was done.

5. The computer-implemented method of claim 1, wherein each indication as to whether the profile information item has been verified comprises:
a verifying entity; and
a verification method.

6. The computer-implemented method of claim 1, further comprising:
periodically re-verifying, by the first online service provider server, one or more of the plurality of profile information items comprising respective user identifying information that is capable of verification; and
updating, by the first online service provider server, each corresponding indication based on the periodic re-verification.

7. The computer-implemented method of claim 1, wherein:
receiving the plurality of profile information items from a user comprises:
receiving a name of the user; and
receiving user identifying information associated with the user's name; and
verifying the user identifying information comprises:
querying, by the first online service provider server, a trusted database based on the user's name and the user identifying information;
determining, based on a result of the query, if a match exists in the database between the user's name and the user identifying information;
in the event a match exists, challenging the user, by the first online service provide server, based on the user identifying information; and
determining, by the first online service provider server, whether to verify the user's identity based on a result of the challenge.

8. The computer-implemented method of claim 1, wherein verifying the first subset of profile information items comprises querying, by the first online service provider server, one or more trusted databases.

9. The computer-implemented method of claim 1, wherein the first online service provider server and the second online service provider server are separate entities.

10. A computer-implemented method comprising:
generating, by a second online service provider server, an identity profile request;
providing, by the second online service provider server, the identity profile request to a first online service provider server;
receiving, at the second online service provider server, an identity profile corresponding with the profile request, the identity profile comprising a plurality of profile information items, each of the profile information items including a verification status of whether the profile information item has been verified, a first subset of the profile information items being unverified and a second subset of the profile information items being verified;
generating, by the second online service provider server, a verification request for verification of one or more of the first subset of profile information items that have not been verified and comprise respective user identifying information that is capable of verification;
providing, by the second online service provider server, the verification request to the first online service provider server; and
receiving, at the second online service provider server, in response to the verification request, a verification status for the identity profile, the verification status comprising respective verification information for each of the first subset of profile information items, wherein the respective information includes a respective indication whether or not the correspondence profile information item has been verified.

11. The computer-implemented method of claim 10, wherein the verification request is generated and provided in response to an initial verification status received with the identity profile.

12. The computer-implemented method of claim 10, wherein the verification request is generated and provided in response to a verification date received with the identity profile exceeding a verification freshness threshold of the second online service provider server.

13. The computer implemented method of claim 10, wherein the first online service provider server and the second online service provider server are separate entities.

14. A computer program product tangibly embodied on a non-transitory computer-readable medium and including executable instructions that, when executed, are configured to cause one or more data processing apparatuses to:
receive a plurality of profile information items from a user, wherein one or more of the plurality of profile information items comprises respective user identifying information that is capable of verification;
store the plurality of profile information items in an identity profile associated with the user, each of the profile information items including a verification status of whether the profile information item has been verified, a first subset of the profile information items being unverified and a second subset of the profile information items being verified;
receive a first request for the plurality of profile information items;
provide the plurality of profile information items in response to the first request;
receive, after providing the plurality of profile information items, a second request to verify the first subset of profile information items;
verify, in response to receiving the second request, the first subset of profile information items;
receiving a third request for the verified first subset; and
providing the verified first subset in response to the third request.

15. The computer program product of claim 14, wherein the executable instructions, when executed, are further configured to cause one or more data processing apparatuses to:
periodically re-verify one or more of the plurality of profile information items comprising respective user identifying information that is capable of verification; and
update each corresponding verification status based on the periodic re-verification.

16. A computer program product tangibly embodied on a non-transitory computer-readable medium and including executable instructions that, when executed, are configured to cause one or more data processing apparatuses to:
generate an identity profile request;
provide, from a second online service provider, the profile request to a first online service provider;
receive an identity profile corresponding with the profile request, the identity profile comprising a plurality of profile information items, each of the profile information items including a verification status of whether the profile information item has been verified, a first subset of the profile information items being unverified and a second subset of the profile information items being verified;
generate a verification request for verification of one or more of the first subset of profile information items that have not been verified and comprise respective user identifying information that is capable of verification;
provide, from the second online service provider, the verification request to the first online service provider; and
receive, in response to the verification request, a verification status for the identify profile, the verification status comprising respective verification information for each of the first subset of profile information items, wherein the respective verification information includes a respective indication whether or not the corresponding profile information item has been verified.

17. The computer program product of claim 16, wherein the executable instruction, when executed, are further configured to cause one or more data processing apparatuses to:
  compare respective verification dates for the one or more profile information items with corresponding freshness thresholds; and
  in the event one or more of the respective verification dates exceeds its corresponding freshness threshold:
    generate a re-verification request for re-verification of the one or more profile information items with verification dates exceeding their corresponding freshness thresholds;
    provide the re-verification request to the first online service provider; and
    receive, in response to the re-verification request, an updated verification status.

18. A system comprising:
  a first online service provider server configured to provide online services to one or more users;
  one or more computer-readable media including machine-executable instructions; one or more instruction processors configured to execute at least a portion of the machine-executable instructions stored in the computer-readable media, wherein execution of the instructions, in response to a request from a user for access to the online services, results in:
  receiving, at the first online service provider server, a plurality of profile information items from the user, wherein one or more of the plurality of profile information items comprises respective user identifying information that is capable of verification;
  storing, by the first online service provider server, the plurality of profile information items in an identity profile associated with the user, each of the profile information items including a verification status of whether the profile information item has been verified, a first subset of the profile information items being unverified and a second subset of the profile information items being verified;
  receiving, at the first online service provide server from a second online service provider server, a first request for the plurality of profile information items;
  providing the plurality of profile information items to the second online service provider in response to the first request;
  receiving, from a second online service provider server and after providing the plurality of profile information items to the second online service provider, a second request to verify the first subset of profile information items;
  verifying, by the first online service provider server, in response to receiving the second request, the first subset of profile information items;
  receiving a third request for the verified first subset; and
  providing the verified first subset in response to the third request.

19. A system comprising:
  a second online service provider server configured to provide online services to one or more users;
  one or more computer-readable media including machine-executable instructions; one or more instruction processors configured to execute at least a portion of the machine-executable instructions stored in the computer-readable media, wherein execution of the instructions, in response to a request from a user for access to the online services, results in:
  generating, by the second online service provider server, an identity profile request;
  providing, by the second online service provider server, the identity profile request to a first online service provider server;
  receiving, at the second online service provider server, an identity profile corresponding with the profile request, the identity profile comprising a plurality of profile information items, each of the profile information items including a verification status of whether the profile information item has been verified, a first subset of the profile information items being unverified and a second subset of the profile information items being verified;
  generating, by the second online service provider server, a verification request for verification of one or more of the first subset of profile information items that have not been verified and comprise respective user identifying information that is capable of verification;
  providing, by the second online service provider server, the verification request to the first online service provider server; and
  receiving, at the second online service provider server, in response to the verification request, a verification status for the identify profile, the verification status comprising respective verification information for each of the first subset of profile information items, wherein the respective verification information includes a respective indication whether or not the corresponding profile information item has been verified.

* * * * *